Nov. 16, 1948.   D. P. HAMLET   2,453,906
DEVICE FOR PRESERVING OBJECTS
REQUIRING LIQUID SUPPLY
Filed Sept. 22, 1945

INVENTOR.
DARREL P. HAMLET
BY
Agt.

Patented Nov. 16, 1948

2,453,906

UNITED STATES PATENT OFFICE 2,453,906

DEVICE FOR PRESERVING OBJECTS REQUIRING LIQUID SUPPLY

Darrel Patton Hamlet, Melrose Park, Ill., assignor to Clarence Bussert, Melrose Park, Ill.

Application September 22, 1945, Serial No. 618,049

4 Claims. (Cl. 47—38)

1

This invention relates broadly to a method, and devices for preserving objects requiring a supply of liquid, or more particularly to the preservation of plants cut off or uprooted.

It is an object of this invention to maintain cut stems of plants in a container adapted to continuously supply water or nutritious liquid to said plants, even after a portion of such liquid has been consumed.

It is another object of this invention to keep containers liquid and airtight after the stems or roots of the plants have been introduced thereinto, to avoid needless loss of liquid, and to continue to supply liquid to the plants when the container is laid down, for instance in transit.

It is also an object of the invention to provide a container suitable to receive liquid and to hold such liquid in continuous contact with a predetermined part of the liquid-surrounding confinements, even after a portion of the liquid initially placed in the container had been used up.

It is a further object of the invention to provide means adapted to grip the stems or roots inserted into the container, and to close the container hermetically by the same operation.

It is, finally, an object of the invention to hold the objects to be supplied with liquid in steady contact with same, and at the same time to cause said liquid to flow to or through those elements of the objects to be preserved, where said liquid is needed for preservation.

In accordance with this invention a flexible diaphragm, preferably, is used as an aid in reaching the goal set forth above.

The invention is illustrated in the drawing by means of two embodiments thereof and described in the specification.

Figure 1:
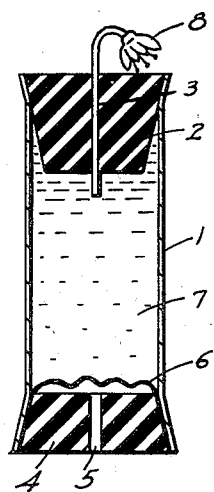
Fig. 1 shows the closed container immediately after a cut flower has been inserted, the liquid has been poured in, and the container has been closed.

Referring to the drawing in which like reference numerals denote similar elements, the invention comprises a container 1 (Fig. 1) made of any liquid impermeable material, which preferably is formed to resemble an open tubular piece. A stopper 2 made completely, or in part, of a re-

2 silient material is wholly or partly introduced into one of the openings at the end of said tubular piece. Said stopper 2 has at least one longitudinal bore 3 suitable for retaining a stem, or stems, or roots of vegetation 8, preferably the stems of flowers or ferns. The size of said bore or bores is such as to give an air-tight fit around a stem, which latter preferably should be cut immediately below the bottom surface of said stopper. Stopper 2 is of a size necessary to make it fit hermetically into container 1.

Another stopper 4 is provided at the other end of said tubular piece 1. It is made completely, or in part, of a flexible material so as to fit tightly into container 1, and it is embraced about its inner end and sides by a flexible diaphragm 6 in such a way that, when the stopper 4 is pressed into the opening of said container 1, said diaphragm 6 is also pressed against the inner wall of said tubular container 1 to form an air-tight seal. The stopper 4 shows a longitudinal bore 5 providing a connection through the bottom surface of said diaphragm 6, and access to an outer medium, for instance the atmosphere.

A fluid 7 such as water, or a nutritious liquid preferably, a solution of a species of sugar or other hydrocarbon is poured into said container 1, after stopper 2 carrying vegetation as described above has been introduced into the opening 3. Fluid should be poured into said container sufficient in volume to completely fill the space within the container, whereupon stopper 4 finally is inserted.

Figure 2:
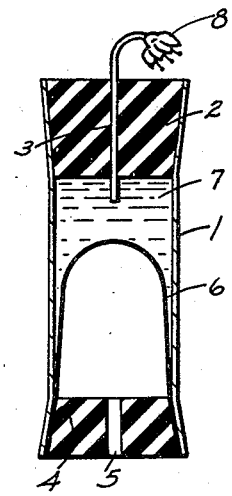
Fig. 2 shows the container with a diaphragm distended under atmospheric pressure, after some of the liquid had been consumed.
Figure 3:
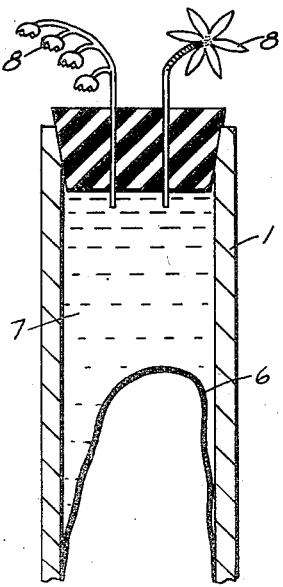
Fig. 3 shows a stopper receiving a plurality of vegetation.

By capillary action, evaporation, pressure and other physical actions, fluid 7 will be caused to pass through the stem, or stems of vegetation 8. Since the outer side of the diaphragm 6, as cited before, by means of bore 5 is in direct contact with the atmosphere, pressure forcing itself against the diaphragm will stretch it to the extent that it will occupy the void left in container 1 (viz. Fig. 2) after a part of the liquid has been consumed. This process will continue until all liquid will be consumed. The liquid within the container will always be subjected to atmospheric pressure, and will take the path of least resistance, that is, because of aid of natural capillary action or breathing of the stem of vegetation inserted into stopper 2, whereby the life of the plant will be prolonged.

Figure 4:
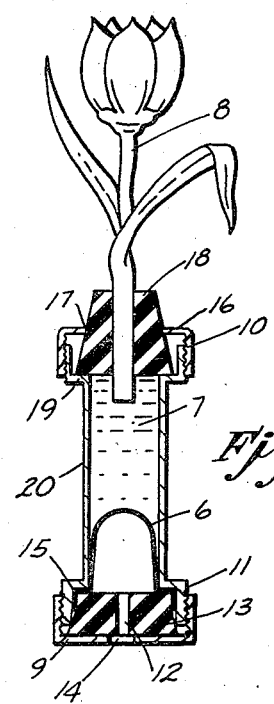
Fig. 4 depicts another embodiment of the invention.

Fig. 4 shows another embodiment of the invention. In this form the ends 10 and 11 of the container 20 are threaded to accommodate caps 9 and 16, respectively. Cap 16, at the top end 10 shows a cut-out 17 being, preferably, of a larger size than the upper end of stopper 18, especially when an upright conical stopper is used. The other end of the said conical stopper 18 should be larger than the said opening 17.

Flexible and resilient material is preferably used, in full or in part, to make the said stopper. The bottom of the said stopper 18, preferably, rests on shoulder 19 of container 20. By this provision an air-tight fit of stopper 18 around the stem or stems 8 results when cap 16 is screwed down, as may be readily seen.

A cap 9 showing an opening 14 is arranged at the other end 11 of said tubular container 20, adapted to force down a flexible stopper 13. The said flexible diaphragm 6 as previously described rests against a shoulder 15 of container 20, causing an air-tight seal at the points of contact. Stopper 13 further shows a longitudinal bore 12 to permit direct contact of the bottom of the diaphragm 6, with the outer atmosphere.

As may be readily seen, both of the devices shown, as forms of this invention may be turned or tilted in any direction or laid down, for example, while being shipped, or stored, without disturbing the nutritive feeding action to the inserted stem, stems, or roots, and the liquid as long as only a slight residue of liquid remain in the container.

The total weight of the liquid used always will be less than the existing atmospheric pressure outside of the container. Thus, the atmospheric pressure will overcome the weight of the liquid in the container plus the flow resistance of the liquid against the container. The diaphragm will continue to dilate until all liquid is exhausted.

The air pressure shown utilized with forms illustrated is only one of the possible means to create the desired action.

Having thus described and disclosed my invention, what I claim as novel and desire to secure by Letters Patent, is:

1. A device of the character described comprising, a tubular container made of waterproof material, a stopper secured to one end of said tubular container and provided with a bore adapted to receive the stem of a plant, a stopper secured to the other end and provided with a bore to admit air under atmospheric pressure into the said tubular container, and an elastic diaphragm having a skirt portion confined by the said last-mentioned stopper between the peripheral surface of the said stopper and the inner walls of the said tubular container.

2. A device of the character described comprising, a tubular container made of waterproof material, a stopper secured to one end of said tubular container and provided with a bore adapted to receive the stem of a plant, a stopper secured to the other end and provided with a bore to admit air under atmospheric pressure into the said tubular container, and an elastic diaphragm having a skirt portion confined by the said last-mentioned stopper between the peripheral surface of the said stopper, and the inner walls of the said tubular container, the said tubular container being filled with liquid nutrition for said plant in its confines above the said diaphragm.

3. A device of the character described comprising, a tubular container having threaded ends, a resilient stopper fitted to each end, threaded caps secured to the said threaded ends confining hermetically the said stoppers, one of said stoppers being provided with a bore to receive the stem of a plant, the other of the said stoppers being provided with a bore to admit air under atmospheric pressure into the said tubular container, and an elastic diaphragm having a skirt portion confined by the said last-mentioned stopper between the peripheral surface of the said stopper and the inner walls of the said tubular container.

4. A device of the character described comprising, a tubular container having threaded ends, a resilient stopper fitted to each end, threaded caps secured to the said threaded ends confining hermetically the said stoppers, one of said stoppers being provided with a bore to receive the stem of a plant, the other of the said stoppers being provided with a bore to admit air under atmospheric pressure into the said tubular container, and an elastic diaphragm having a skirt portion confined by the said last-mentioned stopper between the peripheral surface of the said stopper and the inner walls of the said tubular container, the said tubular container being filled with liquid nutrition for said plant in its confines above the said diaphragm.

DARREL PATTON HAMLET.

REFERENCES CITED

The following references are of record in the file of this patent:

UNITED STATES PATENTS

| Number | Name | Date |
|---|---|---|
| 1,951,777 | Siegler | Mar. 20, 1934 |

FOREIGN PATENTS

| Number | Country | Date |
|---|---|---|
| 156,466 | Germany | Dec. 2, 1904 |